No. 630,946. Patented Aug. 15, 1899.
J. M. STROUT.
WEEDING TOOL.
(Application filed Nov. 21, 1898.)
(No Model.)
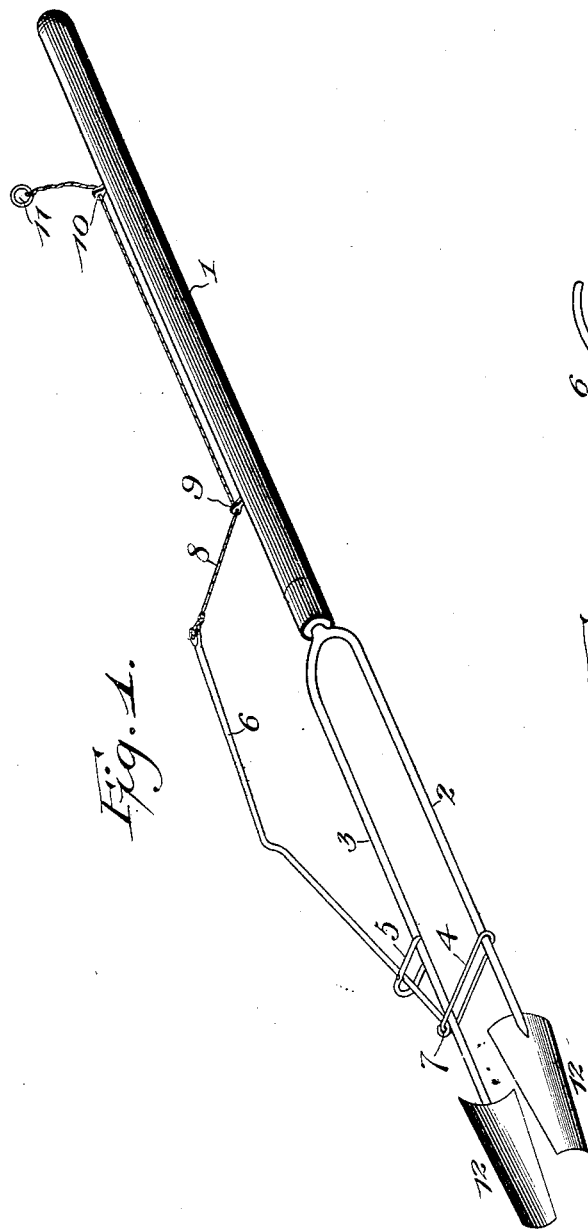
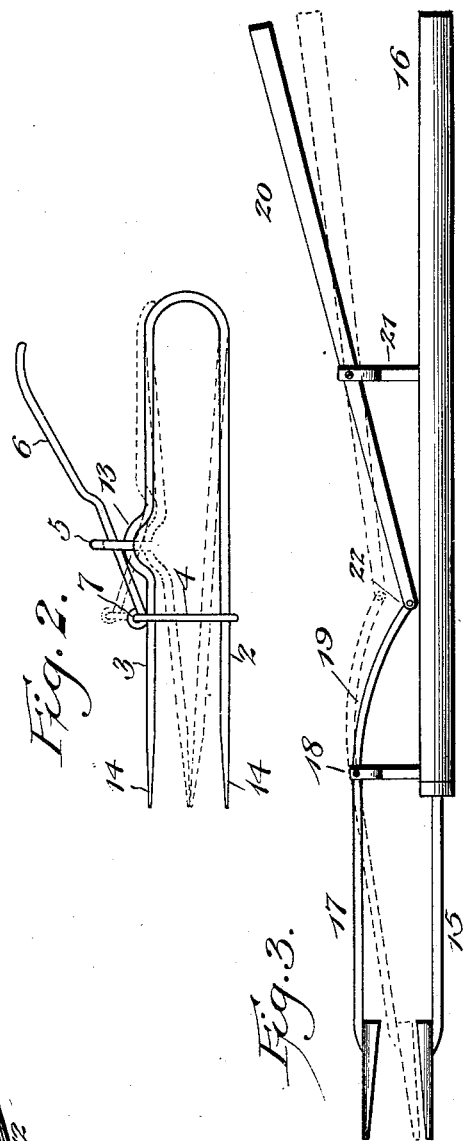
Witnesses
Joseph M. Strout, Inventor.
By his Attorneys.
C. A. Snow & Co.

UNITED STATES PATENT OFFICE.

JOSEPH M. STROUT, OF PORTLAND, MAINE.

WEEDING-TOOL.

SPECIFICATION forming part of Letters Patent No. 630,946, dated August 15, 1899.

Application filed November 21, 1898. Serial No. 697,056. (No model.)

*To all whom it may concern:*

Be it known that I, JOSEPH M. STROUT, a citizen of the United States, residing at Portland, in the county of Cumberland and State of Maine, have invented a new and useful Weeding-Tool, of which the following is a specification.

This invention relates to garden tools or implements; and the object thereof is to provide a transplanter or a weeding-tool adapted to penetrate the ground and grasp the roots of the plant or weed and remove the same from the ground without leaving any of the roots in the ground.

To this end the invention consists in the novel combination and arrangement of parts, as will be hereinafter more fully described, and particularly pointed out in the claims.

In the drawings, Figure 1 is a perspective view of the improved transplanter. Fig. 2 is a perspective view of the device modified to provide a weeding-tool. Fig. 3 is an elevation of a second modified form of implement.

Like numerals of reference denote like and corresponding parts in each of the several figures of the drawings.

Referring to the accompanying drawings, Fig. 1, the implement preferably consists of a handle 1, of suitable length to obviate the necessity of the operator stooping, and a pair of spring-arms 2 and 3. These arms are preferably formed from a single length of spring metal into an approximate U shape, having a shank at their bent ends, whereby they are connected to the handle. One of the arms 2 is provided with a loop 4, which embraces the other arm to form a guide and a stop therefor to limit the expansion of the arms. An approximately U-shaped strap 5 is provided upon the arm 3 above the loop 4, and the lever 6 is pivoted in said strap intermediate of its ends. The shorter end of this lever is provided with a hook or eye 7, which loosely engages the outer end of the loop 4. The lever is arranged in the same plane as the spring-arms and extends upward toward the handle. A cord 8 is secured to the free end of the lever and passes through an eye or pulley 9 near the lower end of the handle and thence along the handle to a point near the upper end thereof, where it passes through an eye 10 and is provided with a ring 11. The free ends of the spring-arms are provided with blades 12, segmental in cross-section and inclined toward their lower ends.

To operate the implement, the blades 12 are forced into the earth at opposite sides of the plant, and the cord 8 is pulled by means of the ring 11, which operates the lever 6 to close the arms and press the blades tightly about the roots of the plant, when the latter, including the roots and accumulated earth, may be taken from the ground and transplanted in another place.

To adapt the implement as a hand-tool, as shown in Fig. 2, the fulcrum-point is formed by a bend 13 in the arm 3, over which the lever 6 engages, and the U-shaped strap 5 acts as a guide to hold the lever in place. This tool is adapted to be grasped by one hand about the bent portion of the arms and over the lever, whereby the tool may be operated with one hand, leaving the other free for any other purpose. The free end of the lever is preferably curved, as shown, to fit the curved rear end of the spring-arms when the latter are drawn together.

A second modified form of implement is illustrated in Fig. 3, in which 15 designates a metallic arm fixedly carried by a wooden or other suitable handle 16, the two forming together a stationary arm. The other arm 17 is pivoted intermediate of its ends within a bearing fork or loop 18, mounted upon the handle, and the rear end of the arm 17 is bent or deflected, as at 19, toward the handle. Means for operating this pivoted arm are provided in the shape of a lever 20, pivoted intermediate of its ends in a loop or fork 21, carried by the handle upon the same side as and alined with the fork 18. A suitable hinged joint 22 connects the adjacent ends of the arm 17 and the operating-lever 20. The arms 15 and 17 may be provided with either the segmental or flat blades, as desired. This form of implement is operated by forcing the outer end of the lever 20 toward the handle 16, which, through its hinged connection with the pivoted arm 17, will throw the latter toward the stationary arm 15 to engage the roots of the plant, as heretofore explained in connection with the other forms of the implement.

In Fig. 1 the implement has been illustrated as a transplanter, being provided with segmental blades, and in Fig. 2 it is shown as equipped with flat blades to form a weeding implement. However, it will be understood that either the segmental or flat blades may be provided upon either of the forms of the implement, so that each may be used as a transplanter or as a weeding-tool.

The construction and arrangement herein set forth provides a transplanter or a weeding-tool in which the arms carrying the blades may easily and effectively be clamped about the plant or weed to remove the same from the ground.

Changes in the form, proportion, and minor details may be made without departing from the spirit and scope or sacrificing any of the advantages of the present invention.

Having thus described the invention, what I claim is—

1. In a device of the class described, the combination with a pair of spring-arms carrying blades at their free ends, of a guide in the form of a loop carried by one of the arms and embracing the other arm, and a lever connected with the loop and adapted to engage a fulcrum-point on one of said arms, whereby the arms may be drawn or forced together, substantially as shown and described.

2. In a device of the class described, the combination with a pair of spring-arms carrying blades at their free ends, of a guide in the form of a loop attached to one of the arms and embracing the other and providing a stop therefor, and a lever loosely connected to the outer end of the loop and adapted to engage a fulcrum-point provided on one of said arms, whereby the arms may be drawn or forced together, substantially as shown and described.

3. In a device of the class described, the combination with a pair of spring-arms carrying blades at their free ends, of a guide in the form of a loop, embracing the arms and providing a stop therefor, a lever loosely connected to one end of the loop, an approximately U-shaped strap provided upon one of said arms and embracing the lever, and a fulcrum-point on the latter arm for said lever, substantially as shown and described.

4. In a device of the class described, the combination with a pair of spring-arms carrying blades at their free ends, of a guide-loop provided upon one of the arms, embracing the other arm and forming a stop therefor, a lever loosely connected to the outer end of the loop, an approximately U-shaped strap provided upon one of said arms and embracing the lever, the latter being pivoted within said strap, substantially as shown and described.

5. In a device of the class described, the combination with a pair of spring-arms carrying blades at their free ends, of a guide-loop provided upon one of the arms, embracing the other arm and forming a stop therefor, a lever loosely connected to the outer end of the loop, an approximately U-shaped strap provided upon one of said arms and embracing the lever, the latter being pivoted to the strap, substantially as shown and described.

6. In a device of the class described, the combination with a pair of spring-arms carrying blades at their free ends and a handle at their other ends, of a guide-loop provided upon one of the arms, embracing the other arm and forming a stop therefor, a lever connected to said loop and adapted to engage a fulcrum-point formed on one of said arms, eyes or pulleys provided upon the handle, and a cord or other suitable means connected to the lever and passing through the eyes or pulleys, whereby the arms may be operated, substantially as shown and described.

In testimony that I claim the foregoing as my own I have hereto affixed my signature in the presence of two witnesses.

JOSEPH M. STROUT.

Witnesses:
JOHN J. GOODY,
FRANK H. HASKELL.